Sept. 20, 1971 W. TOBLER 3,606,358
HIGH-PRESSURE SEALING DEVICES
Filed Dec. 6, 1968 2 Sheets-Sheet 1

INVENTOR
WERNER TOBLER

BY *Craig & Antonelli*

ATTORNEYS

Sept. 20, 1971　　　　W. TOBLER　　　　3,606,358
HIGH-PRESSURE SEALING DEVICES
Filed Dec. 6, 1968　　　　　　　　　　　2 Sheets-Sheet 2

INVENTOR
WERNER TOBLER

BY *Craig & Rickwell*

ATTORNEYS

United States Patent Office 3,606,358
Patented Sept. 20, 1971

3,606,358
HIGH-PRESSURE SEALING DEVICES
Werner Tobler, Winterthur, Switzerland, assignor to Kistler Instruments AG, Winterthur, Switzerland
Filed Dec. 6, 1968, Ser. No. 781,807
Claims priority, application Switzerland, Dec. 6, 1967, 17,119/67
Int. Cl. F16j 15/06
U.S. Cl. 277—170                                    7 Claims

ABSTRACT OF THE DISCLOSURE

A high-pressure sealing arrangement for components which are provided with a lip portion defined by a groove and adapted to seat directly on the seating surface around the groove.

The present invention relates to high-pressure sealing devices, especially for measurements involving fluid media at high pressures.

Numerous problems arise in measurement techniques where one is concerned with installing a measurement element in a pressure body which is to be brought into sealing connection with the pressure medium. Such measurement procedures may relate to pressure measurements on hydraulic, ballistic or general pressure systems. In this case the usual procedure is to provide a measuring bore at the object to be measured in which the measurement pipe or the pressure measurement transducer is installed. To provide a sealing connection, screws are used in which the sealing surfaces are either pressed mechanically rigidly against one another or are sealed by means of sealing rings, for example O-rings.

Rubber O-rings are very widely used today as sealing means as thew permit sealed screw joints to be produced simply and which can readily be released at any time. In many cases copper rings are also placed between the screws, or other metal rings, especially if the pressure medium is at high temperatures or high pressures. Especially in the higher pressure ranges such metal sealing rings must be frequently tightened. There may, however, be difficulty on disassembly as a result of deformation so that they cannot always be removed from the screws. Moreover, by the plastic deformation of such sealing rings exact positioning of the installed measurement transducer is difficult since such seals must always be tightened again.

The object of the invention is concerned with a seal with which either rubber O-rings or metallic sealing rings can be used according to the application and temperature range. The invention permits a simply produced bore in which the measurement transducer or the measurement pipe can be installed and permits rapid interchange thereof. Moreover, it permits an exact positioning of the measurement transducer or the measurement pipe.

The features of the invention are explained on the basis of an example. It relates to the installation of a pressure measurement transducer in a measuring bore, for example, in a gun barrel etc. The invention can, however, also be used for any other desired screw fastening which must be reliable and suitable for the widest range of pressure media. For the purpose of simple mounting the measurement transducer is provided with a screw thread which fits the thread in the receiving bore. Additionally, a specially constructed sealing part is necessary in which the sealing ring is disposed.

Figure 1:
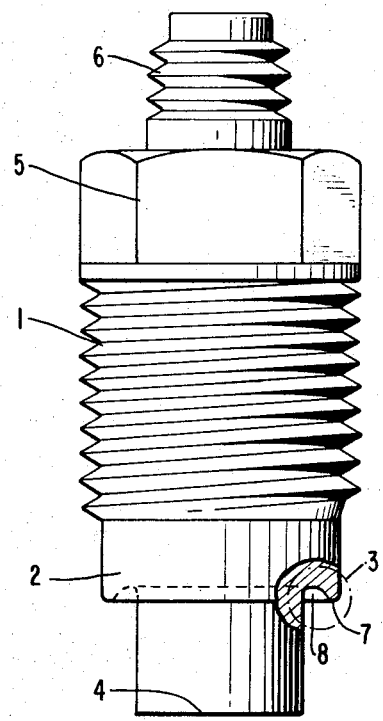
Figure 2:
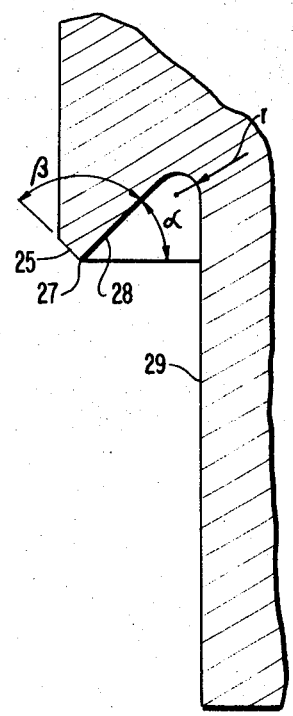
Figure 3:
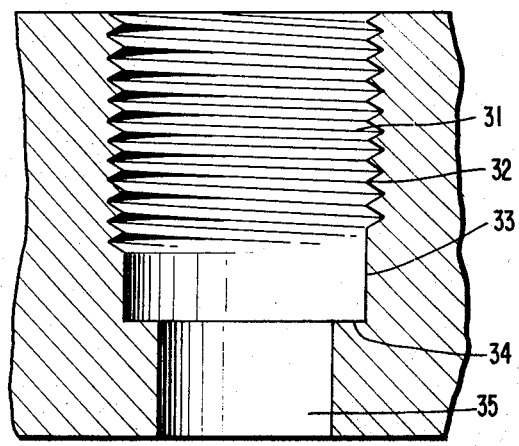
Figure 4:
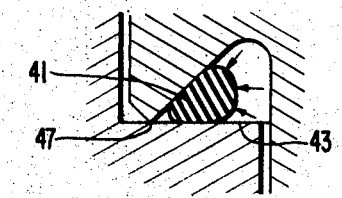
Figure 5:
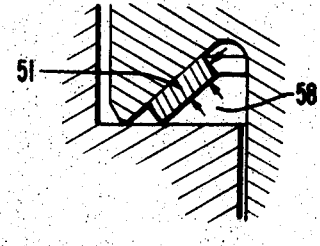
Figure 6:
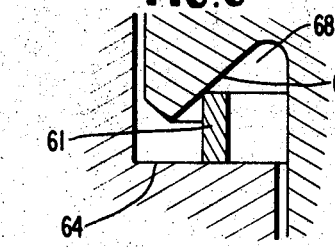
Figure 7:
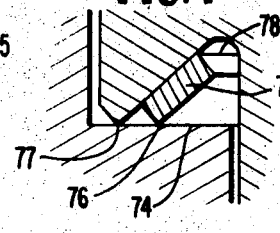
Figure 8:
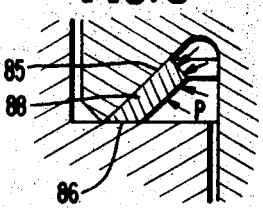
Figure 9A:
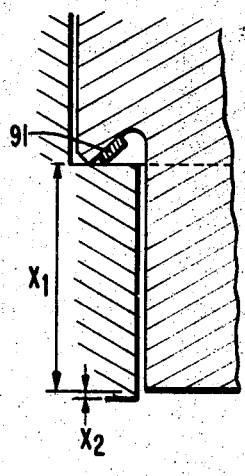
Figure 9B:
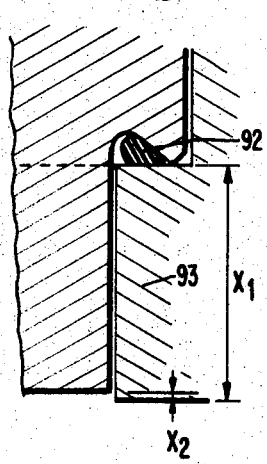
Figure 10:
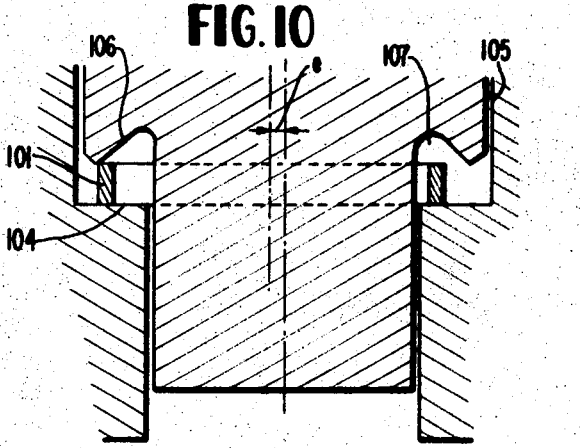
Figure 11A:
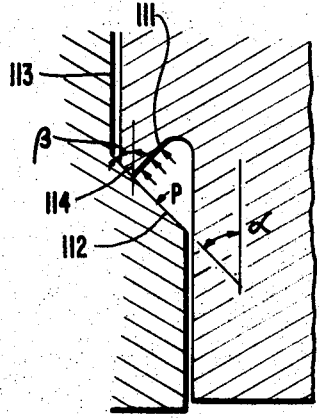
Figure 11B:
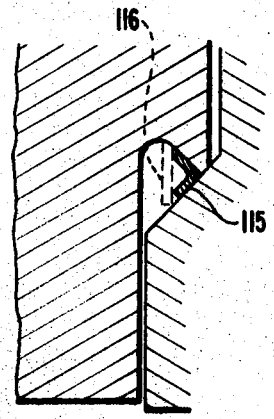

The features of the invention will be explained with reference to the following figures as the example:

FIG. 1 shows a pressure transducer in elevation,
FIG. 2 shows a section through the sealing part 3 in FIG. 1,
FIG. 3 shows the receiving bore prepared for the pressure transducer, FIG. 1.
FIG. 4 shows the sealing part of the pressure transducer after screwing in with a rubber O-ring in position,
FIG. 5 shows the same sealing part but with a metal sealing ring,
FIG. 6 shows the sealing part before screwing down the transducer with inserted metal sealing ring,
FIG. 7 shows the same sealing part but after screwing down the measuring transducer,
FIG. 8 shows also the same sealing part but after the action of the medium pressure on the sealing part,
FIGS. 9a and 9b show the sealing part and the positioning of the measurement transducer,
FIG. 10 shows the sealing part with a substantially eccentrically inserted sealing ring, and
FIG. 11a shows the sealing part and transducer without a seal therebetween, and
FIG. 11b shows the deformation of a metal sealing ring when the conical sealing surfaces are brought together.

As shown in FIG. 1 the measurement transducer consist of the transducer body 1 with a screw-in thread, a measuring element head 2, a sealing ring part 3, a pressure-sensitive part 4, a hexagon spanner grip 5 and a socket 6. The sealing part 3 consists of a sharp-edged sealing lip 7 and a ring-shaped, downwardly open hollow space 8 so as to form a roof-shaped groove. The shape of the sealing part 3 is explained further in FIG. 2. In front of the sharp-edged sealing lip 27 there is a V-shaped groove 28 having a transfer radius $r$ which leads to the cylindrical measuring part 29 of the pressure transducer. The angle $\alpha$ of the undercutting of the bevelled face of the groove 28 can be 45°, the angle $\beta$ of the knife edge sealing lip 27 can amount to 90°. It is, however, also possible to vary this angle within wide limits. On assembly the sealing ring is inserted with a little grease in the recessed groove 8 and then the measurement transducer is placed in the measuring bore 31 and tightened until the torque value is reached which ensures proper sealing.

The receiving bore corresponding to FIG. 3 consists of a receiving thread 32, a socket part 33, a shoulder part 34 and a connecting duct 35. Such a receiving bore can be produced in three operations and requires no special precision tools and machines. The measurement responder, i.e. the transducer 1, is screwed into the measuring bore until the sealing lip 7 is pressed on the shoulder part 34.

FIG. 4 shows the sealing part of the inserted measurement transducer including a commercially usual O-ring 41 inserted in the sealing groove. The sharp-edged sealing part 47 engages the shoulder part 43 and thus hinders deflection of the O-ring when the latter is subjected to pressure.

In FIG. 5 the same sealing part is shown but in place of the O-ring, a metal ring 51 is inserted in the sealing groove 58.

FIGS. 6, 7 and 8 show how the metal sealing ring functions during the screwing-in and sealing operation. FIG. 6 shows the condition at the moment where the metal ring 61 held by grease in the sealing groove 68 comes just to rest on the shoulder part 64 of the receiving bore. The thin-walled but elongated sealing ring 61 is centered during the screwing-in operation by the conical bevelled surface 65. On screwing-in the measurement transducer further, the sealing ring 71 is deformed, as shown in FIG. 7, until the measurement transducer is pressed by its knife edged sealing lip 77 into the shoulder part 74 of the receiving bore. The measurement transducer thus comes to a definite stop and its location is positioned to a precisely determined extent.

By the deformation of the sealing ring 71 there is produced on the latter a sealing edge 76 which is also pressed against the shoulder part 74. The grease present in the sealing groove is pressed out. After the action of the pressure medium p the sealing ring 88 is however deformed as shown in FIG. 8 in that the latter is deformed along the wedge-shaped sliding surface 85 and a sealing pressure proportional to the pressure of the medium is produced on the sealing surface 86. If the measurement transducer is now dismounted, the sealing ring 88 remains adherent to the wall 85. It can however be immediately released by a light blow. The deformed sealing ring 88 can be immediately placed again in the sealing groove and is satisfactorily sealed again when tightened up. The torque which must be exerted to secure satisfactory sealing for pressure media up to, for example, 7000 atmospheres and more, is approximately of the same order of magnitude as with rubber O-rings. Re-tightening of the transducer after several pressure tests is not necessary since the sealing action is obtained automatically by the pressure of the medium.

In FIG. 9 the sealing part of the measurement transducer described is shown again, on the left-hand side with the metal sealing ring 91 according to the invention, on the right-hand side with a commercially usual rubber O-ring 92. In both cases the measurement transducer has just the same position relatively to the receiving bore 93.

The sealing part according to the invention is shown in FIG. 10 wherein the metal sealing ring 101 is placed very eccentrically on the shoulder 104 of the receiving bore 105. On screwing in the measurement transducer, automatic centering of the sealing ring 101 occurs immediately by the conical surface 106 of the sealing groove 107.

FIG. 11 shows a modification in which the seating face 112 of the receiving bore 113 is arranged as a conical seating surface. So far as the angle β of the sealing lip 114 is equal to the angle of the seating face 112, a satisfactory metallic seal is possible without any interposition of an additional seal. The pressure forces p press the slightly elastic sealing lip 114 against the coned face 112 and thereby exert increasing force with increasing pressure. The condition is however satisfactory machining of the sealing bore. Otherwise a satisfactory sealing effect can be obtained also in this case by interposing a cylindrical sealing ring according to the invention which after insertion is brought into the form shown at 115. Also in this case the sealing shape is first obtained during assembly corresponding to the geometrical conditions of the bore.

By the construction of the sealing part of the measurement transducer and of the receiving bore according to the invention, either commercially available rubber O-rings or metal sealing rings can be used. The metal sealing rings have the great advantage that they are applicable for all pressure media and also for high temperatures or flame action. By the fact that the metal sealing ring is so deformed by its special shape and the shape of the sealing groove during the tightening operation that it fits automatically to the sealing parts provided and that this fitting action is further continued after reaching the screwed-in position by the pressure action of the pressure medium, an outstanding sealing effect is obtained. The requirement for precision of the receiving bore and of the sealing parts is minimal since the metal sealing ring fits itself automatically to the conditions encountered. The possibility that the metal sealing ring can be exchanged at any time for a commercial O-ring increases the utility of the sealing part of the invention.

I claim:

1. A high-pressure sealing arrangement including a component fitted to a structure having an opening, said component including a coned face lip portion defining a roof-shaped groove in the component on the surface thereof facing a substantially flat sealing surface provided at the opening, the lip portion having a second coned face opposed to the first-mentioned coned face, and a sealing element received in the roof-shaped groove being deformed during the assembly operation and by the pressure acting thereon to form a sealed connection.

2. A sealing arrangement according to claim 1 wherein the sealing surface at the opening consists of a ring surface against which the lip portion is pressed and on which the sealing element can move for free centering until the deformation operation commences by which the sealing ring is brought to its sealing form.

3. A high-pressure sealing arrangement including a component fitted to a structure having an opening, said component including a coned face lip portion defining a roof-shaped groove in the component on the surface thereof facing a coned face sealing surface provided at the opening, and a sealing element received in the roof-shaped groove being deformed during the assembly operation and by the pressure acting thereon to form a sealed connection, wherein the lip portion has a second coned face surface mating with the coned face sealing surface so that satisfactory sealing is produced by pressing on the coned face sealing surface, whereby the sealing pressure force is automatically increased by increasing pressure.

4. A sealing arrangement according to claim 3, wherein the sealing element is a cylindrical sealing ring and is deformed in the angle formed between the lip portion and the sealing surface, whereby satisfactory sealing is attained even at very high pressures.

5. A sealing arrangement according to claim 1, wherein the sealing element is an O-ring fitted in the groove of the component to provide satisfactory sealing after deformation.

6. A sealing arrangement according to claim 1, wherein the sealing element is a metallic sealing ring located in the groove and receives its final sealing form by deformation thereof during the assembly operation.

7. A sealing arrangement according to claim 1, wherein the opening is screw-threaded to receive the component, and the opposed coned faces terminate in a sharp sealing edge which is to be pressed against the sealing surface at the opening.

References Cited

UNITED STATES PATENTS

| | | | |
|---|---|---|---|
| 3,245,655 | 4/1966 | Oetjens | 277—207X |
| 3,262,722 | 7/1966 | Gastineau et al. | 277—180X |
| 3,275,348 | 9/1966 | Scott | 277—112X |
| 2,641,381 | 6/1953 | Bertrand | 277—236X |
| 3,145,035 | 8/1964 | Hanback | 285—M.S. |
| 3,395,934 | 8/1968 | Rosan et al. | 285—211X |

MILTON KAUFMAN, Primary Examiner

U.S. Cl. X.R.

287—112, 236; 285—220, 351